(12) United States Patent
Yen et al.

(10) Patent No.: US 6,938,017 B2
(45) Date of Patent: *Aug. 30, 2005

(54) SCALABLE, FRAUD RESISTANT GRAPHICAL PAYMENT INDICIA

(75) Inventors: Jonathan Yen, San Jose, CA (US); Chit Wei Saw, Cupertino, CA (US); Doron Shaked, Haifa (IL); Avraham Levy, Kiryat-Tivon (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 396 days.

This patent is subject to a terminal disclaimer.

(21) Appl. No.: 09/728,297

(22) Filed: Dec. 1, 2000

(65) Prior Publication Data

US 2002/0103764 A1 Aug. 1, 2002

(51) Int. Cl.⁷ .............................. G06F 17/60; H04K 1/00
(52) U.S. Cl. ...................... 705/62; 705/401; 705/408; 382/101; 382/100; 382/173; 713/176
(58) Field of Search ...................... 705/60–62, 401–408; 382/100–101, 23.2; 380/39, 210, 252, 287; 283/113; 358/3.06, 2.1; 713/176, 179; 295/462.1

(56) References Cited

U.S. PATENT DOCUMENTS

| | | | | |
|---|---|---|---|---|
| 4,637,051 A | * | 1/1987 | Clark | .......................... 382/101 |
| 4,777,357 A | | 10/1988 | Harada et al. | |
| 4,822,986 A | | 4/1989 | Guthmueller et al. | |
| 4,901,073 A | | 2/1990 | Kibrick | |
| 4,924,078 A | | 5/1990 | Sant'Anselmo et al. | |
| 5,060,980 A | | 10/1991 | Johnson et al. | |

(Continued)

FOREIGN PATENT DOCUMENTS

| | | |
|---|---|---|
| EP | 0647925 | 4/1995 |
| EP | 0881601 | 12/1998 |
| EP | 0913789 | 5/1999 |
| EP | 0952558 | 10/1999 |
| EP | 1001382 | 5/2000 |
| WO | WO9966456 | 12/1999 |
| WO | WO 0011599 | 3/2000 |
| WO | WO0065541 | 11/2000 |

OTHER PUBLICATIONS

Zhigang Fan, "Dot–to–dot error diffusion," Journal of Electronic Imaging, vol. 2(1) (Jan. 1993).
N. Damera–Venkata and B. L. Evans, "FM Halftoning Via Block Error Diffusion," Proc. IEEE International Conference on Image Processing, Oct. 7–10, 2001, vol. II, pp. 1081–1084, Thessaloniki, Greece.
Antognini et al., "A Flexibly Configurable 2D Bar Code," pp. 1–36 (Before May 25, 2000) (http://www.paperdisk.com/ibippa–pr.htm).

*Primary Examiner*—James P. Trammell
*Assistant Examiner*—Kambiz Abdi

(57) ABSTRACT

Payment indicia generating schemes are described that enable users to customize the appearance of the payment indicium and to accommodate a wide variety of validation processing environments, while providing a substantial defense against fraudulent photocopy attack. In some embodiments, a corroborative digital token is generated from payment information, and a base image is modulated with a graphical encoding of the corroborative digital token to produce a payment indicium. In some embodiments, a payment indicium containing embedded payment information is rendered on a printing surface with a printing characteristic that degrades with photographic reproductions such that the embedded payment information is extractable from an original rendering of the payment indicium but is un-extractable from a photographic reproduction of an original rendering of the payment indicium. In some embodiments, payment information is encoded into a corroborative digital token based at least in part upon one or more variable encoding parameters, and a payment indicium containing the encoded payment information is rendered.

20 Claims, 6 Drawing Sheets

U.S. PATENT DOCUMENTS

| | | | |
|---|---|---|---|
| 5,075,862 A | * 12/1991 | Doeberl et al. | 358/1.18 |
| 5,091,966 A | 2/1992 | Bloomberg et al. | |
| 5,120,940 A | 6/1992 | Willsie | |
| 5,195,123 A | 3/1993 | Clement, Jr. | |
| 5,315,098 A | * 5/1994 | Tow | 235/494 |
| 5,337,361 A | 8/1994 | Wang | |
| 5,339,170 A | 8/1994 | Fan | |
| 5,442,459 A | 8/1995 | Gahang | |
| 5,459,307 A | 10/1995 | Klotz, Jr. | |
| 5,486,686 A | 1/1996 | Zdybel, Jr. et al. | |
| 5,513,563 A | * 5/1996 | Berson | 101/91 |
| 5,523,552 A | 6/1996 | Shellhammer et al. | |
| 5,527,407 A | 6/1996 | Gartland et al. | |
| 5,541,396 A | 7/1996 | Rentsch | |
| 5,550,365 A | 8/1996 | Klancnik et al. | |
| 5,591,956 A | 1/1997 | Longacre, Jr. | |
| 5,644,408 A | 7/1997 | Li et al. | |
| 5,661,284 A | 8/1997 | Freeman et al. | |
| 5,682,030 A | 10/1997 | Kubon | |
| 5,706,099 A | * 1/1998 | Curry | 358/3.28 |
| 5,710,636 A | 1/1998 | Curry | |
| 5,710,814 A | * 1/1998 | Klemba et al. | 713/173 |
| 5,778,076 A | 7/1998 | Kara et al. | |
| 5,790,703 A | * 8/1998 | Wang | 358/3.28 |
| 5,799,112 A | 8/1998 | de Queiroz et al. | |
| 5,801,944 A | 9/1998 | Kara | |
| 5,818,970 A | 10/1998 | Ishikawa et al. | |
| 5,819,240 A | 10/1998 | Kara | |
| 5,835,615 A | 11/1998 | Lubow et al. | |
| 5,866,895 A | 2/1999 | Fukuda et al. | |
| 5,871,288 A | * 2/1999 | Ryan et al. | 400/103 |
| 5,880,451 A | 3/1999 | Smith et al. | |
| 5,897,669 A | 4/1999 | Matsui | |
| 5,898,166 A | 4/1999 | Fukuda et al. | |
| 5,912,745 A | 6/1999 | Ulichney | |
| 5,946,414 A | 8/1999 | Cass | |
| 5,946,415 A | 8/1999 | Su et al. | |
| 5,953,426 A | * 9/1999 | Windel et al. | 380/51 |
| 5,974,147 A | 10/1999 | Cordery et al. | |
| 5,974,200 A | 10/1999 | Zhou et al. | |
| 5,982,896 A | * 11/1999 | Cordery et al. | 705/62 |
| 5,996,893 A | 12/1999 | Soscia | |
| 6,032,861 A | 3/2000 | Lemelson et al. | |
| 6,064,738 A | 5/2000 | Fridrich | |
| 6,064,764 A | * 5/2000 | Bhaskaran et al. | 382/183 |
| 6,116,510 A | 9/2000 | Nishino | |
| 6,128,735 A | * 10/2000 | Goldstein et al. | 713/166 |
| 6,141,441 A | 10/2000 | Cass et al. | |
| 6,141,450 A | 10/2000 | Chen et al. | |
| 6,151,590 A | * 11/2000 | Cordery et al. | 705/60 |
| 6,172,773 B1 | 1/2001 | Ulichney | |
| 6,175,827 B1 | * 1/2001 | Cordery et al. | 705/410 |
| 6,193,158 B1 | 2/2001 | Hecht et al. | |
| 6,201,901 B1 | 3/2001 | Zhou et al. | |
| 6,212,504 B1 | 4/2001 | Hayosh | |
| 6,240,196 B1 | * 5/2001 | Fischer et al. | 382/100 |
| 6,240,212 B1 | 5/2001 | Son et al. | |
| 6,252,675 B1 | * 6/2001 | Jacobs | 358/1.9 |
| 6,256,398 B1 | 7/2001 | Chang | |
| 6,263,086 B1 | * 7/2001 | Wang | 382/100 |
| 6,311,214 B1 | * 10/2001 | Rhoads | 709/217 |
| 6,345,104 B1 | 2/2002 | Rhoads | |
| 6,364,209 B1 | 4/2002 | Tatsuta et al. | |
| 6,373,587 B1 | 4/2002 | Sansone | |
| 6,398,117 B1 | 6/2002 | Oakeson et al. | |
| 6,427,021 B1 | * 7/2002 | Fischer et al. | 382/101 |
| 6,430,302 B2 | * 8/2002 | Rhoads | 382/100 |
| 6,457,651 B2 | 10/2002 | Paul et al. | |
| 6,459,803 B1 | * 10/2002 | Powell et al. | 380/100 |
| 6,470,096 B2 | 10/2002 | Davies et al. | |
| 6,493,110 B1 | * 12/2002 | Roberts | 358/1.2 |
| 6,510,997 B1 | 1/2003 | Wilz et al. | |
| 6,526,155 B1 | * 2/2003 | Wang et al. | 382/100 |
| 6,611,623 B2 | 8/2003 | Konishi et al. | |
| 6,751,352 B1 | * 6/2004 | Baharav et al. | 382/183 |
| 2001/0047476 A1 | * 11/2001 | Yen et al. | 713/168 |

* cited by examiner

SCALABLE, FRAUD RESISTANT GRAPHICAL PAYMENT INDICIA

CROSS-REFERENCE TO RELATED APPLICATIONS

This application is related to U.S. patent application Ser. No. 09/579,070, filed May 25, 2000, by Doron Shaked et al., and entitled "A Method and Apparatus for Generating and Decoding a Visually Significant Bar Code," which is incorporated herein by reference.

TECHNICAL FIELD

This invention relates to systems and methods for rendering scalable, fraud resistant graphical payment indicia.

BACKGROUND

A bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying a series of bars and spaces in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar code symbols may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

The United States Postal Service (USPS) has proposed an Information Based Indicia Program (IBIP) that allows users to purchase and print postage with their computers. In accordance with the IBIP, the printed postage indicium includes a large, two-dimensional bar code that contains certain required postal data, including information that conveys evidence that postage has been paid and information used for mail processing. The required postal data is cryptographically transformed into a digital token using a cryptographic key that is held within a secure postage accounting device that is assigned to each user. The digital token is validated by a verifier with access to a public key corresponding to the secret key of the accounting device. By validating the information embedded within the postage indicia, the USPS may verify the integrity and authenticity of the data contained within the postage indicia and, therefore, may be reasonably certain that the required postage has been paid.

SUMMARY

The invention features novel schemes for generating payment indicia that enable users to customize the appearance of the payment indicia and to accommodate a wide variety of validation processing environments, while providing a substantial defense against fraudulent photocopy attack.

In one aspect, the invention features a payment indicium generating method in accordance with which a corroborative digital token is generated from payment information, and a base image is modulated with a graphical encoding of the corroborative digital token to produce a payment indicium.

As used herein, the term "corroborative digital token" refers broadly to a digital token from which the sender of information or the information itself, or both, may be authenticated.

Embodiments in accordance with this aspect of the invention may include one or more of the following features.

The corroborative digital token preferably is generated from a cryptographic transformation of the payment information. The payment information may include an indication of payment amount and postal data. The postal data may include destination address information and a geographical deposit area postal code.

The base image may include a user-selected image. The base image preferably is rendered based upon a half-tone encoding process.

In another aspect of the invention, a payment indicium containing embedded payment information is rendered on a printing surface with a printing characteristic that degrades with photographic reproductions such that the embedded payment information is extractable from an original rendering of the payment indicium but is un-extractable from a photographic reproduction of an original rendering of the payment indicium.

Embodiments in accordance with this aspect of the invention may include one or more of the following features.

The payment indicium may be rendered as a bit map image with a resolution selected to be irreproducible by photographic reproduction techniques having a maximum resolution of 600×600 dots per inch, or less. In some embodiments, the payment indicium is rendered as a bit map image with a resolution of 100 dots per inch, or greater. In other embodiments, the payment indicium is rendered as a bit map image with a resolution of 125 dots per inch, or greater. The payment indicium preferably is rendered with a resolution selected based at least in part upon how the payment indicium is rendered on the printing surface.

In another aspect, the invention features a payment indicium generating method in accordance with which payment information is encoded into a corroborative digital token based at least in part upon one or more variable encoding parameters, and a payment indicium containing the encoded payment information is rendered.

Embodiments in accordance with this aspect of the invention may include one or more of the following features.

One or more of the encoding parameters may vary with payment value. For example, an encoding security level parameter (e.g., an encoding private key bit length parameter) may vary with payment value. An encoding robustness parameter (e.g., an error correction code redundancy parameter) also may vary with payment value.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1A:
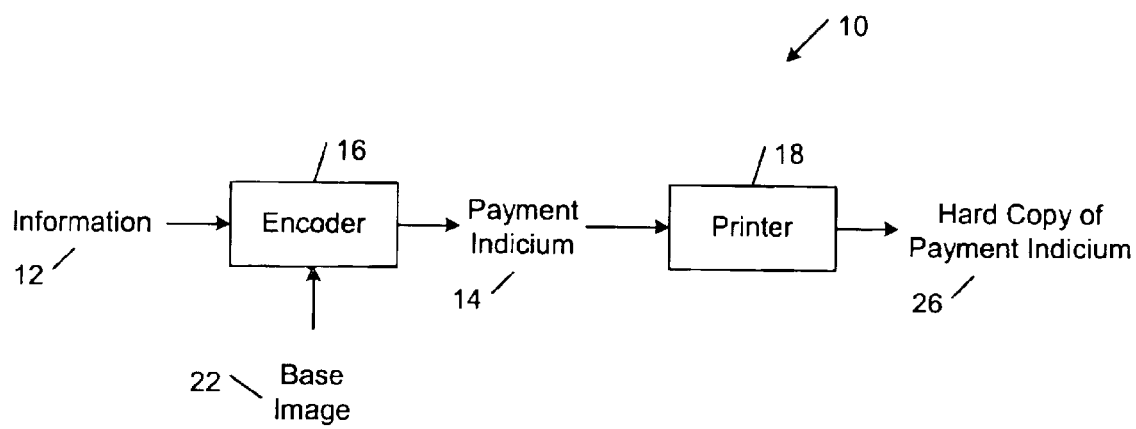
FIG. 1A is a diagrammatic view of a system for encoding information into a payment indicium.
Figure 1B:
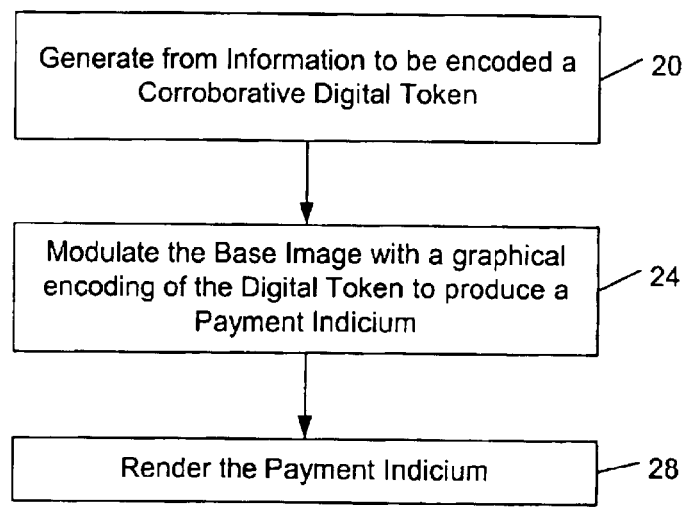
FIG. 1B is a flow diagram of a method of encoding information into a payment indicium.

Referring to FIGS. 1A and 1B, in one embodiment, a system 10 for encoding information 12 into a payment indicium 14 includes an encoder 16 and a printer 18. Encoder 16 may be a computer or other programmable processor, and printer 18 may be a conventional printer (e.g., a LaserJet® printer available from Hewlett-Packard Company of Palo Alto, Calif., U.S.A.) or a special-purpose label printing device. In operation, encoder 16 generates a corroborative digital token from information 12 (step 20). Encoder 16 modulates a base image 22 with a graphical encoding of the digital token to produce payment indicium 14 (step 24). Base image 22 may be any graphical pattern, including a logo (e.g., a company logo), graphics, pictures, text (e.g., a company acronym), images, or any pattern that has visual significance. The digital token may be embedded in the graphical design of text, pictures, images, borders, or the background of base image 22 to produce payment indicium 14. The information may be embedded in payment indicium 14 in the form of a binary image (e.g., a black and white dot pattern), a multilevel image (e.g., a gray-level image), or a multilevel color image. Printer 18 produces a hard copy 26 of payment indicium 14 that may be transferred physically from a sender to a recipient (step 28). Hard copy 26 may be in the form of any one of a wide variety of printed materials, including a mailing label and an envelope carrying a postage indicium. In other embodiments, payment indicium 14 may be rendered by other printing processes. Alternatively, payment indicium 14 may be rendered in an electronic format.

In cases where payment indicium 14 is intended to evidence payment of postage, information 12 may include the date and time, the current balance of the postage metering device, the strike counter of total transactions, the serial number of meter, a transaction identifier, the debit amount, the addressee ZIP code, the addressee name, the class of postage, the user's registration identifier, and the user's name, company and address.

Figure 2:
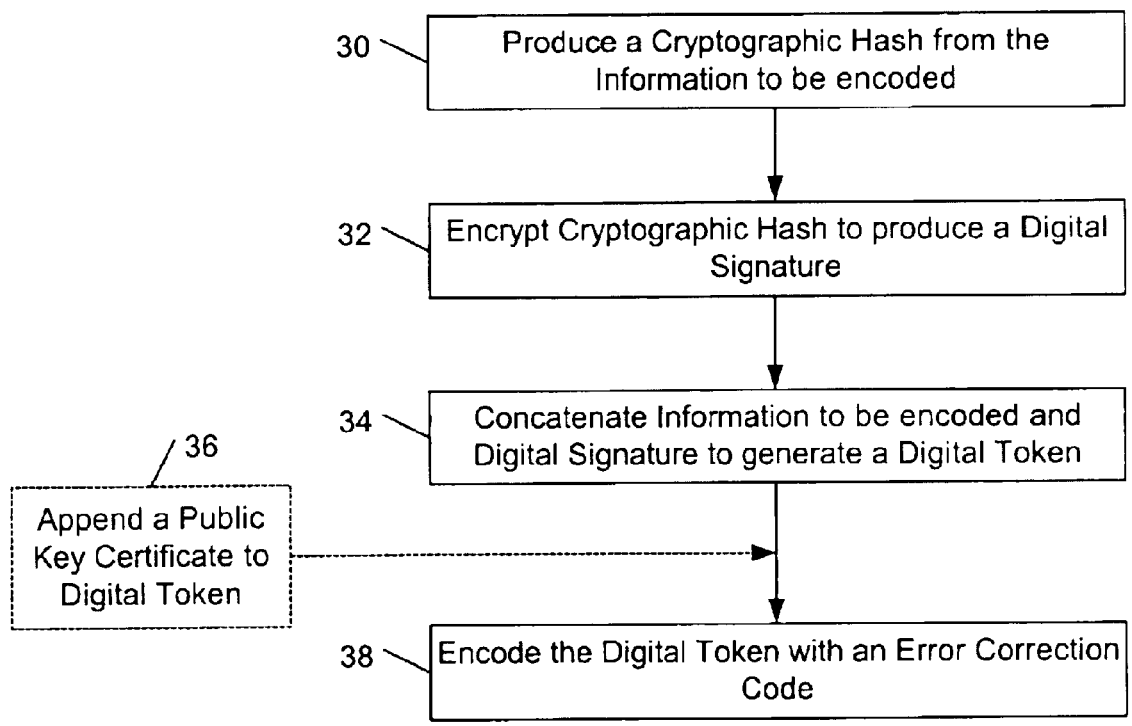
FIG. 2 is a flow diagram of a method of generating a corroborative digital token from information to be encoded.

Referring to FIG. 2, in one embodiment, encoder 16 may be programmed to generate a corroborative digital token from information 12 as follows. Encoder 16 produces a cryptographic hash from information 12 (step 30). The cryptographic hash may be generated by passing information 12 through a one-way encryption process (or digesting process), such as a hashing routine. Preferably, the digesting process is configured such that the probability that two different electronic documents will generate the same cryptographic hash is very low. Encoder 16 encrypts the cryptographic hash to produce a digital signature (step 32). In an asymmetric (public key) cryptographic embodiment, the cryptographic hash is encrypted with the sender's private key. Encoder 16 concatenates information 12 and the digital signature to generate a digital token (step 34). In some embodiments, a public key certificate is appended to the digital token (step 36). The public key certificate may be issued by a certification authority. The public key certificate may contain a certification by a certification authority that a particular public key is the public key of a particular entity (e.g., the sender), and that this entity is the holder of the corresponding private key. In addition, the public key certificate may contain, among other items, the name of the certification authority, the name of the certificate holder, the expiration date of the certificate, the public key of the certificate holder, and a digital signature generated by the certification authority. As used herein, the term "digital token" refers to a digital token with or without an appended public key certificate. Encoder 16 encodes the resulting digital token with an error correction code (step 38). The error correction code may be a conventional convolutional (tree) code or a conventional block code. For example, the error correction code may be a standard 16→31 bit BCH code that corrects for three errors.

Figure 3A:
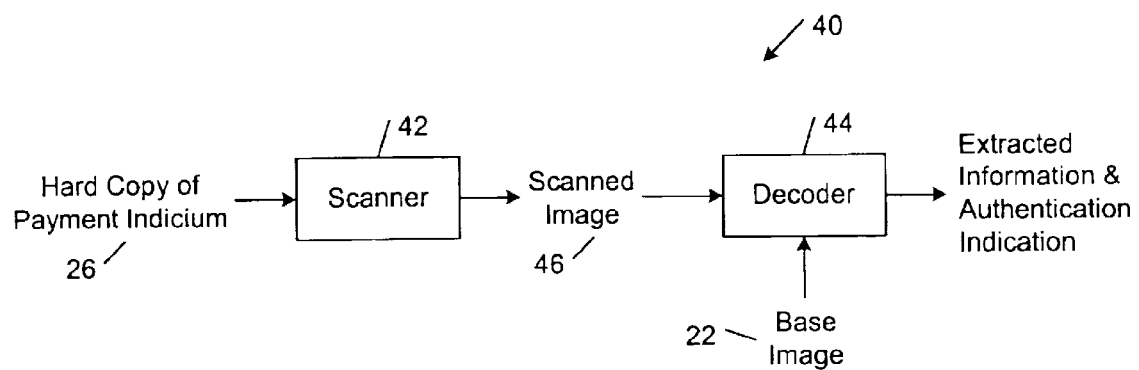
FIG. 3A is a diagrammatic view of a system for extracting information from a payment indicium.
Figure 3B:
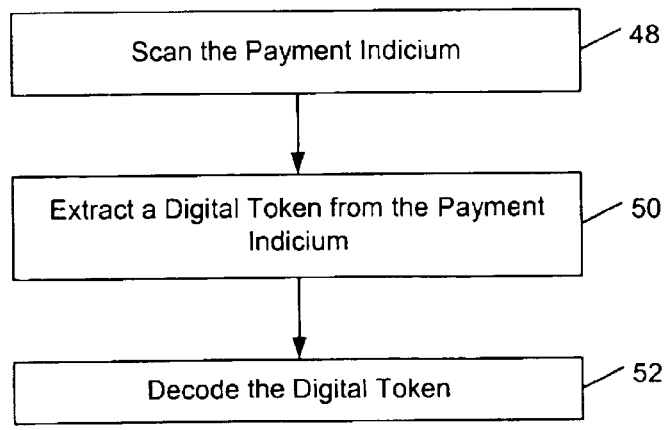
FIG. 3B is a flow diagram of a method of extracting information from a payment indicium.

As shown in FIGS. 3A and 3B, in one embodiment, a system 40 for decoding information 12 from payment indicium 14 includes a scanner 42 and a decoder 44. Scanner 42 may be a conventional desktop optical scanner (e.g., a ScanJet® scanner available from Hewlett-Packard Company of Palo Alto, Calif., U.S.A.) or a portable scanner (e.g., a CapShare® portable scanner available from Hewlett-Packard Company of Palo Alto, Calif., U.S.A.). Decoder 44 may be a computer or other programmable processor. In operation, scanner 42 reads hard copy 26 to produce a digitized scanned image 46 that includes payment indicium 14 (step 48). Decoder 44 extracts a digital token from scanned image 46 based upon a comparison of scanned image 46 and base image 22 (step 50). Decoder 32 decodes the digital token to produce a decoded message (step 52). The digital token may be decoded using a conventional error correction code decoding process.

Figure 4:
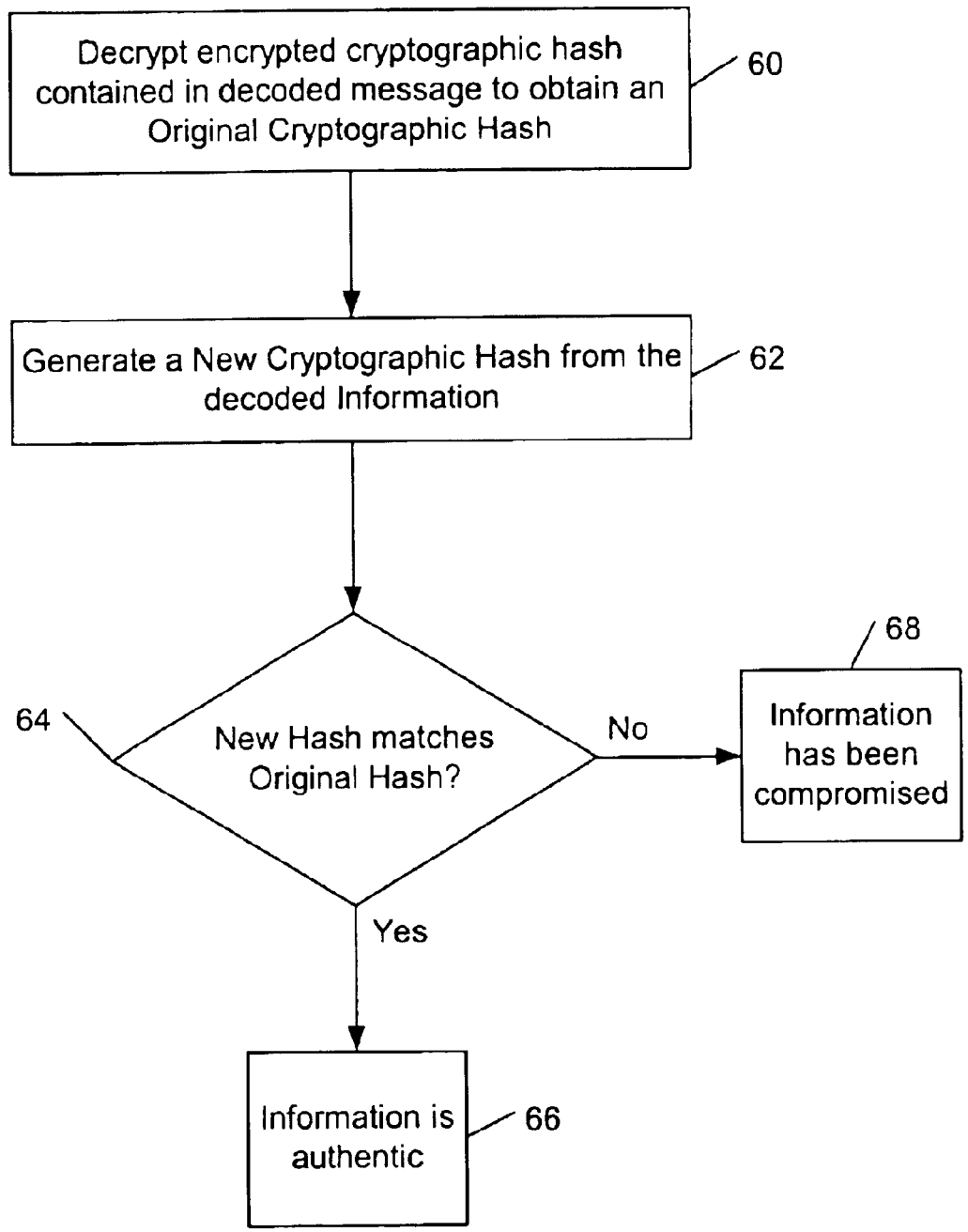
FIG. 4 is a flow diagram of a method of authenticating information extracted from a payment indicium.

Referring to FIG. 4, in one embodiment, information extracted from a payment indicium may be authenticated as follows. Decoder 32 decrypts the encrypted cryptographic hash contained in the decoded message to obtain an original cryptographic hash (step 60). The encrypted cryptographic hash may be decrypted, for example, using the sender's public key, which may be obtained from an appended public key certificate or may be obtained in some other way. Decoder 32 also generates a new cryptographic hash from the information contained in the decoded message using the same digesting process that was used to produce the original cryptographic hash (step 62). Decoder 32 compares the original cryptographic hash with the new cryptographic hash (step 64). If the new cryptographic hash matches the original cryptographic hash, the information is authentic (step 66). That is, the information was digitally signed by the private key corresponding to the public key that was used to recover the original cryptographic hash, and the information was not changed from the time that it was signed to the time that the digital signature was verified. Thus, the authentication process of FIG. 4 may be used to verify the authenticity of information 12 or the identity of the sender of information 12, or both. If the new cryptographic hash does not match the original cryptographic hash (step 64), the information has been compromised (step 68).

If a public key certificate is appended to the extracted digital token, the public key certificate may provide a level of assurance as to the identity of the holder of the private key corresponding to a particular public key. The authenticity of the public key certificate may be tested by verifying the certification authority's digital signature using the certification authority's public key.

Figure 5A:
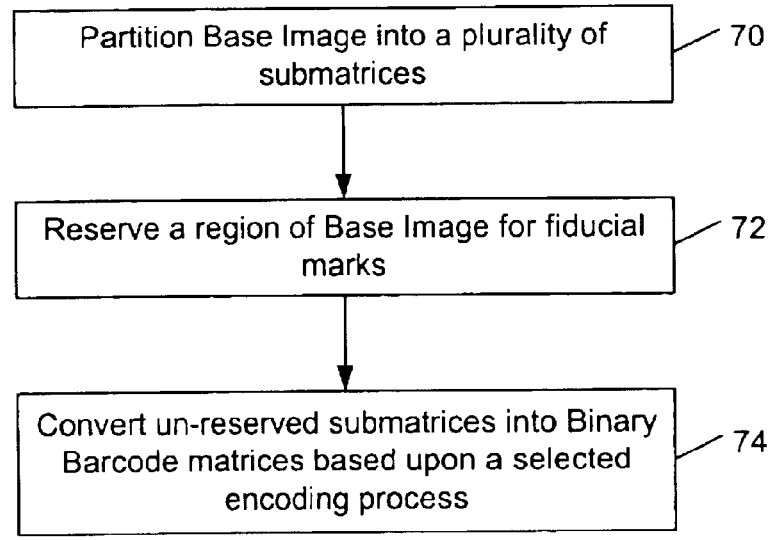
FIG. 5A is a flow diagram of a method of rendering a base image with a graphical encoding of a digital token.
Figure 5B:
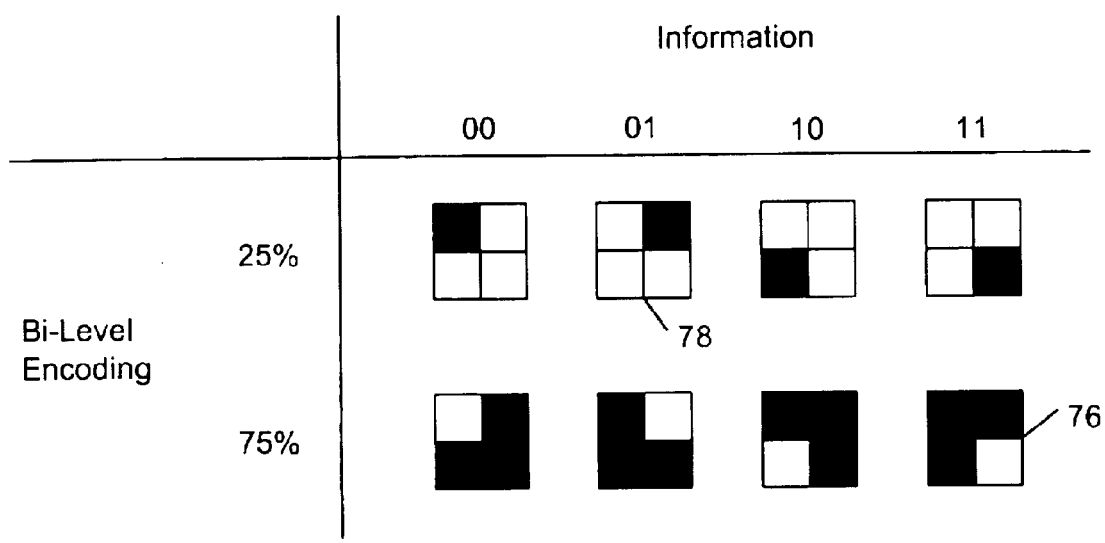
FIG. 5B is a table mapping information to a two-bit bi-level graphical code.

Referring to FIGS. 5A and 5B, base image 22 may be rendered with a graphical encoding of a digital token in accordance with the graphical encoding scheme described in co-pending U.S. patent application Ser. No. 09/579,070, filed May 25, 2000, by Doron Shaked et al., and entitled "A Method and Apparatus for Generating and Decoding a Visually Significant Bar code." In accordance with this graphical encoding process, base image 22 is partitioned into a plurality of sub-matrices (step 70). A region of base image 22 is reserved for fiducial markings (step 72). Un-reserved sub-matrices are converted into binary bar code matrices based upon a selected encoding process (step 74). For example, in one graphical encoding embodiment, information may be encoded into a bi-level image by a two-bit encoding process based upon the two-by-two halftone patterns (or matrices) illustrated in FIG. 5B. In accordance with this graphical encoding process, sub-matrices in base image 22 undergo a thresholding process and a bi-level half-toning process. For example, in one embodiment, sub-matrices in base image 22 that have a gray level that is less than 50% are encoded with one of the four bar code matrices in the 25% row of FIG. 5B. Sub-matrices in base image 22 that have a gray level that is at least 50% are encoded with one of the four bar code matrices in the 75% row of FIG. 5B. In other embodiments, the encoding threshold level may be greater than or less than 50%. The particular bar code matrix used to render a sub-matrix of base image 22 is selected base upon the information to be encoded. For example, if "11" is to be encoded at a 75% gray level sub-matrix location, bar code matrix 76 is used to render that sub-matrix. Similarly, if "01" is to be encoded at a 25% gray level sub-matrix location, bar code matrix 78 is used to render that sub-matrix.

In general, the graphical encoding process of FIGS. 5A and 5B may be extended to n-bit encoding mappings, where n has an integer value of 1 or greater. For example, in one embodiment, information is encoded by a five-bit encoding process based upon three-by-three halftone patterns.

As mentioned above, payment indicium 14 may be rendered such a way that the embedded information cannot be extracted from a photographic reproduction of the postage indicium (at least with respect to commonly available photographic reproduction techniques). In some embodiments, payment indicium is rendered on a printing surface with a printing resolution selected to be irreproducible by photographic reproduction techniques that have a maximum copying resolution of 600×600 dots per inch (DPI), or less. As shown in Table 1 below, the selected printing resolution depends, at least in part, upon the printing technique used to render payment indicium 14 on the printing surface.

TABLE 1

Extractability of Information Embedded in Original Payment Indicia Renderings and in Consecutive Photographic Reproductions of Payment Indicia

| | Resilience to Consecutive Copying | 75 DPI Printer Resolution | 100 DPI Printer Resolution | 125 DPI Printer Resolution |
|---|---|---|---|---|
| HP LaserJet ® Printer | Original | Extractable | Extractable | Extractable |
| | 1st Copy | Extractable | Extractable | Un-Extractable |
| | 2nd Copy | Extractable | Un-Extractable | Un-Extractable |
| | 3rd Copy | Un-Extractable | Un-Extractable | Un-Extractable |
| HP DeskJet ® Printer | Original | Extractable | Extractable | Extractable |
| | 1st Copy | Extractable | Un-Extractable | Un-Extractable |
| | 2nd Copy | Un-Extractable | Un-Extractable | Un-Extractable |
| | 3rd Copy | Un-Extractable | Un-Extractable | Un-Extractable |

Thus, in some embodiments, payment indicium 14 is rendered with a printing resolution selected based at least in part upon the process used to render payment indicium 14. In particular, in an effort to foil simple fraudulent photocopy attacks, in one embodiment, payment indicium 14 is printed with a printing resolution of 125 DPI, or greater, for laser printer renderings and with a printing resolution of 100 DPI, or greater, for ink-jet printer renderings.

Figure 6A:
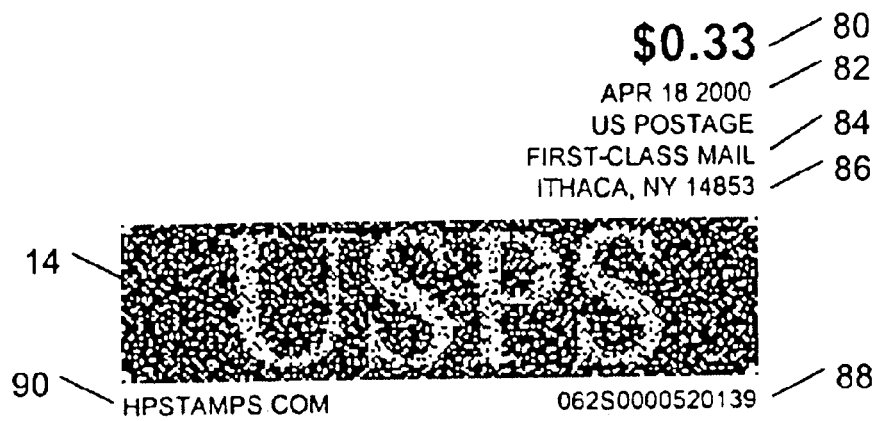
FIG. 6A is a diagrammatic view of a payment indicium having the appearance of the USPS acronym.
Figure 6B:
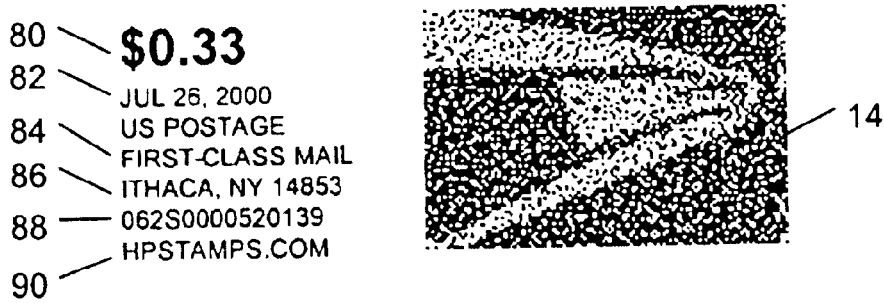
FIG. 6B is a diagrammatic view of a payment indicium having the appearance of the USPS logo.
Figure 6C:
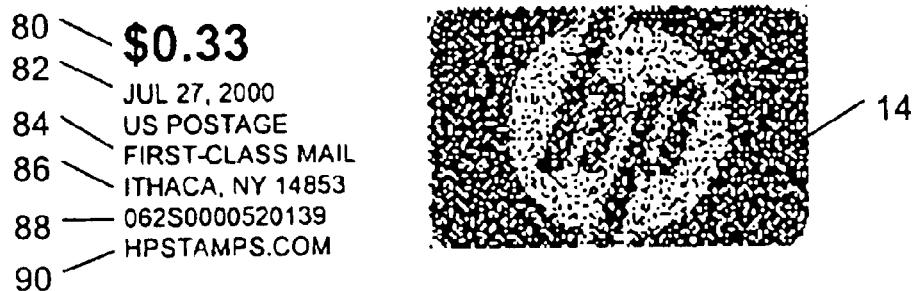
FIG. 6C is a diagrammatic view of a payment indicium having the appearance of a Hewlett-Packard Company logo.

As shown in FIGS. 6A–6C, the rendered payment indicium 14 may have a variety of different visual appearances depending upon the selected base image 22. For example, payment indicium 14 may have the appearance of a company acronym (e.g., "USPS") or a company logo (e.g., a USPS logo or a Hewlett-Packard Company logo). In accordance with the USPS IBIP, a complete postage information based indicium includes printed text information as well as payment indicium 14. The printed text information may include a postage amount 80, a mailing date 82, a rate category 84, a licensing post office identifier 86, and a rendering device identifier 88. Other information, such as an issuing device vendor identifier 90, also may be included.

In some embodiments, the security level or the robustness level, or both, of payment indicium 14 may be scaled to enable users to fully customize the graphical appearance of the payment indicia while accommodating the particular processing environment available for extracting and authenticating the information embedded in the payment indicia. In one embodiment, one or more of the encoding parameters of the process that encodes payment information into the corroborative digital token may be varied to reduce the amount of processing needed to extract the digital token from payment indicium 14. For example, the bit-length of the private key used to encode the payment information into the digital token may vary with the monetary value represented by payment indicium 14, with longer bit lengths being used for higher-value payment indicia. In addition, the robustness level of the information encoded in payment indicium 14 may vary with monetary value. For example, a 16→31 bit BCH error correction code may be used for payment indicia values that are greater than or equal to $1, and a 8→15 bit BCH error correction code may be used for payment indicia values that are less than $1. In some embodiments, the robustness level of the encoded information preferably is greater than a minimum robustness level that is selected based upon security considerations, such as preventing photocopy attack. By reducing the amount of information that must be encoded in payment indicium 14, the required minimum size of payment indicium 14 may be reduced. In this way, a user may have greater freedom in customizing the visual appearance of payment indicium 14.

In sum, the above-described embodiments provide novel schemes for producing scalable, fraud resistant graphical payment indicia. The payment indicia may have the appearance of a selected visually significant graphical image (e.g., a company acronym or a company logo), rather than the visually non-significant images of conventional two-dimensional bar code symbols. The above-described embodiments also provide a way to scale the security level and the robustness level of payment indicia to enable users to fully customize the graphical appearance of the payment indicia while accommodating the particular processing environment available for extracting and authenticate the information embedded therein.

The systems and methods described herein are not limited to any particular hardware or software configuration, but rather they may be implemented in any computing or processing environment. The encoding and decoding processes described above may be implemented in a high level procedural or object oriented programming language, or in assembly or machine language; in any case, the programming language may be a compiled or interpreted language.

Other embodiments are within the scope of the claims.

For example, although the above embodiments are described with respect to an asymmetric (public key) cryptographic embodiment, other embodiments may be implemented using a symmetric (secret key) cryptographic scheme in which the cryptographic hash is encrypted with the sender's secret key. In addition, although the above embodiments are described with respect to fixed-pattern halftoning methods, other embodiments may utilize different halftoning methods, including cluster dithering (e.g., blue noise) methods and error diffusion methods. Furthermore, payment indicium 14 may represent any form of monetary payment, including USPS postage and parcel shipment payment indicia of other parcel carriers (e.g., United Parcel Service, Federal Express and DHL Worldwide Express).

Still other embodiments are within the scope of the claims.

What is claimed is:

1. A machine-implemented method of generating a payment indicium, comprising:
   generating a corroborative digital token from payment information; and
   modulating a base image with a graphical encoding of the corroborative digital token to produce a payment indicium by
      dividing the base image into multiple image areas,
      segmenting image areas into multiple groups based on pix values in the image areas, and
      encoding the segmented image areas with sets of two-dimensional code patterns to graphically encode the corroborative digital token in the payment indicium, wherein each set of code patterns encodes a respective corresponding group of image areas.

2. The method of claim 1, wherein the payment information from which the corroborative digital token is generated includes an indication of payment amount.

3. The method of claim 1, wherein the payment information from which the corroborative digital token is generated includes postal data.

4. The method of claim 3, wherein the postal data includes destination address information.

5. The method of claim 1, wherein the base image includes a user-selected image.

6. The method of claim 1, wherein the corroborative digital token is generated from a cryptographic transformation of the payment information.

7. The method of claim 1, wherein the image areas to be encoded are segmented into multiple halftone groups based on gray level values in the images to be encoded, and the segmented image areas are encoded with respective corresponding sets of two-dimensional, coded halftone patterns.

8. A data processing system for generating a payment indicium, comprising an encoder configured to:
   generate a corroborative digital token from payment information; and
   modulate a base image with a graphical encoding of the corroborative digital token to produce a payment indicium by
      dividing the base image into multiple image areas,
      segmenting image areas into multiple groups based on pixel values in the image areas, and
      encoding the segmented image areas with sets of two-dimensional code patterns to graphically encode the corroborative digital token in the payment indicium, wherein each set of code patterns encodes a respective corresponding group of image areas.

9. A machine-implemented method of generating a payment indicium, comprising:
   selecting at least one encoding level based on a payment value specified in the payment information;
   encoding payment information into a corroborative digital token with the at least one selected encoding level; and
   rendering a payment indicium containing the encoded payment information.

10. The method of claim 9, wherein an encoding security level parameter varies with payment value.

11. The method of claim 10, wherein an encoding private key bit length parameter varies with payment value.

12. The method of claim 9, wherein an encoding robustness level parameter varies with payment value.

13. The method of claim 12, wherein an error correction code redundancy parameter varies with payment value.

14. The system of claim 8, wherein image areas to be encoded are segmented into multiple halftone groups based on gray level values in the images to be encoded, and the segmented image areas are encoded with respective corresponding sets of two-dimensional, coded halftone patterns.

15. A machine-implemented method of generating a payment indicium with a printer of a particular type, comprising:
   generating a corroborative digital token from payment information;
   dividing a base image into multiple image areas;
   segmenting image areas into multiple groups based on pixel value in the image areas;

encoding the segmented image areas with sets of two-dimensional code patterns to graphically encode the corroborative digital token in the payment indicium, wherein each set of code patterns encodes a respective corresponding group of image areas, wherein image areas to be encoded are segmented into multiple halftone groups based on gray level values in the images to be encoded, and the segmented image areas are encoded with respective corresponding sets of two-dimensional, coded halftone patterns;

identifying the type of the printer;

setting the printer to a printing resolution based on the identified type of the printer; and printing the payment indicium containing embedded payment information on a printing surface with the printer set to the selected printing resolution.

16. The method of claim 9, further comprising:

dividing a base image into multiple image areas;

segmenting image areas into multiple groups based on pixel values in the image areas; and encoding the segmented image areas with sets of two-dimension code patterns to graphically encode the corroborative digital token in the payment indicium, wherein each set of code patterns encodes a respective corresponding group of image areas.

17. The method of claim 16, wherein image areas to be encoded are segmented into multiple halftone groups based on gray level values in the images to be encoded, and the segmented image areas are encoded with respective corresponding sets of two-dimensional, coded halftone patterns.

18. The method of claim 1, wherein encoding the segmented image areas comprises converting at least one of the image areas to a respective barcode matrix corresponding to a symbol in the digital token and contained in one of multiple predetermined barcode matrix sets selected based on pixel values in the image region being converted, wherein each barcode matrix set includes a respective barcode matrix for each possible symbol in the digital token, and barcode matrices in different sets encoding a common message symbol have different respective spatial patterns of dots selected from a set of different color dots.

19. The method of claim 15, wherein encoding the segmented image areas comprises converting at least one of the image areas to a respective barcode matrix corresponding to a symbol in the digital token and contained in one of multiple predetermined barcode matrix sets selected based on pixel values in the image region being converted, wherein each barcode matrix set includes a respective barcode matrix for each possible symbol in the digital token, and barcode matrices in different sets encoding a common message symbol have different respective spatial patterns of dots selected from a set of different color dots.

20. The method of claim 16, wherein encoding the segmented image areas comprises converting at least one of the image areas to a respective barcode matrix corresponding to a symbol in the digital token and contained in one of multiple predetermined barcode matrix sets selected based on pixel values in the image region being converted, wherein each barcode matrix set includes a respective barcode matrix for each possible symbol in the digital token, and barcode matrices in different sets encoding a common message symbol have different respective spatial patterns of dots selected from a set of different color dots.

* * * * *